United States Patent [19]
Lucier

[11] Patent Number: 5,623,776
[45] Date of Patent: Apr. 29, 1997

[54] ONE PIECE TRANSPARENT LICENSE PLATE PROTECTOR AND METHOD OF MAKING SAME

[76] Inventor: David F. Lucier, 3837 St. Clair Rd., Stoney Pt., Ontario, Canada, N0R 1N0

[21] Appl. No.: 336,302

[22] Filed: Nov. 8, 1994

[51] Int. Cl.$^6$ ........................................... G05F 7/00
[52] U.S. Cl. ................................... 40/209; 40/737
[58] Field of Search .......................... 40/200, 209, 661, 40/152, 152.1; D12/193

[56] References Cited

U.S. PATENT DOCUMENTS

| | | | |
|---|---|---|---|
| 1,816,741 | 7/1931 | Orester et al. | |
| 1,821,053 | 9/1931 | Dietz et al. | |
| 1,864,641 | 9/1932 | Davis. | |
| 2,093,620 | 9/1937 | Roessler | 40/125 |
| 2,211,923 | 8/1940 | Dittmar | 40/125 |
| 2,361,499 | 10/1944 | Joffo | 40/209 |
| 2,501,176 | 3/1950 | Jacobs | 40/125 |
| 2,555,706 | 6/1951 | Schultz | 40/125 |
| 2,815,598 | 12/1957 | Gazan | 40/125 |
| 2,827,722 | 3/1958 | Leclerc | 40/125 |
| 2,921,395 | 1/1960 | Fishman | 40/209 |
| 3,755,945 | 9/1973 | McEwen | 40/209 |
| 4,891,895 | 1/1990 | DeLaquil, Jr. | 40/209 |
| 4,924,611 | 5/1990 | Shaw | 40/210 |
| 5,012,602 | 5/1991 | Storey | 40/209 |
| 5,222,315 | 6/1993 | Lovison | 40/152.1 |

FOREIGN PATENT DOCUMENTS 540747  9/1955  Belgium ............................ 40/209

OTHER PUBLICATIONS

General Advertising, License Plate Protector (undated).
J.C. Whitney & Co Catalog, Catalog No. 495P, 1988, p. 126 Unbreakable License Plate Protector, p. 127, "Moving" Light Plate Frames.

*Primary Examiner*—Kenneth J. Dorner
*Assistant Examiner*—Cassandra Davis
*Attorney, Agent, or Firm*—M. Michael Hamburg

[57] ABSTRACT

An improved license plate protector comprises a one piece flexible cover made of relatively high impact strength polycarbonate resin, which remains substantially transparent and damage resistant even upon marring, scratching and weathering of the cover during use. The plate protector further comprises an improved structural technique for positioning and securing a one piece, light weight plate protector to a license plate and a motor vehicle, and protecting the license plate, through the combined use of a perimeter rib, retaining tabs, a plurality of positioning tabs, corresponding attachment locations and a plurality of attachment holes. A method of making a license plate protector as described comprises the steps of drying polycarbonate resin with a heater, and forming a license plate protector by application of heat and pressure to such resin in a molding device having mold surfaces comprising material selected from the group consisting of stainless steel and chrome plating.

17 Claims, 2 Drawing Sheets

ONE PIECE TRANSPARENT LICENSE PLATE PROTECTOR AND METHOD OF MAKING SAME

BACKGROUND OF THE INVENTION

This invention relates to an improved one piece license plate protector.

More specifically, this invention involves a one piece license plate protector made of flexible polycarbonate resin, such that the plate protector remains substantially transparent even after the surface has been marred or scratched in use; is highly resistant to cracking or similar structural damage, and uses an improved technique to position and secure the one piece protector about a license plate, and to protect the license plate.

A variety of devices have been used or proposed for use to protect license plates from damage and from becoming visually obscured by dirt, salt or other road hazards. As an example of a problem encountered with unprotected license plates, damage may occur by snagging the plate in a car wash.

Some devices have involved metallic frames with a primary purpose of protecting the edges of license plates, and securing the plate to the motor vehicle. These devices suffered from a variety of shortcomings, such as unduly complicated designs which required the vehicle owner to assemble a multiple part device. A further problem involved the risk of rust which could become unsightly and potentially corrosive to the plate as well.

Other approaches used transparent materials which were inserted into a metallic or other type of frame, thus affording some measure of protection to the face of the plate. Such devices still did not provide uniform sealing of the plate from the weather and other elements encountered in motor vehicle use, and yet continued the necessity of dealing with multiple components when changing plates or otherwise having a need to remove the cover.

There have been attempts to produce a license plate frame or cover by using a one piece design made of plastic resin. Such protectors have suffered from one or more of the characteristics of being too flimsy or too brittle, not offering a secure connection of cover to plate to protect the plate without excessive rattling or vibration, or simply becoming obscured over time by the marring, scratching and adverse weather conditions to which the protector was subjected. Some of these devices simply involved open face frames which primarily were to protect the edges of the plate and provide a one piece device to attach the plate to the vehicle.

Such protectors have thus frequently offered a compromise of heavy, unwieldy devices which do not offer full protection to the face of the plate, or lighter, simpler designs which may provide some protection of the face but are more susceptible to plate protector damage that may interfere with the protection to be provided to the license plate. Where the plate protector initially offers a covering to the face, surface damage or weather induced changes to the plate protector may obscure the license plate information which is intended to remain visually clear.

In other instances, the type of material used to construct the protector contributes to a device which still has one or more undesirable features. A plate protector which eliminates flimsy and brittle structure, maintains clarity of appearance when marred in use, and yet has the flexibility to provide alternative positioning and connection techniques that vary with license plate requirements, simply has not been available.

It can be seen, therefore, that there are a variety of problems with conventional license plate protectors. What is lacking is a flexible one piece protector which remains substantially transparent even upon marring, scratching and weathering during use, avoids disadvantages such as incomplete protection of the license plate from exterior elements and undue rust conditions, undesirable brittleness, flimsy structure, inability to adapt plate protectors for use with all State license plates, and still provides a three dimensional, pre-defined positional relationship with a license plate that improves fit and connection of a one piece protector to the license plate and the motor vehicle. In addition, a method is needed to make license plate protectors that incorporate these features, without incurring rapid wear or damage to a molding device that is used. Where transparent protectors are desired, relatively minor imperfections in mold surfaces of the molding device are undesirable because of possible alteration of protector surfaces and appearance.

Thus it can be seen that a need exists for an improved one piece license plate protector that remains flexible and substantially transparent even in use, offers increased resistance to structural damage sustained in operation, utilizes a technique for positioning and securing the protector and license plate to the motor vehicle which adapts to different applications, and yet provides a secure attachment, with improved plate protection. Also needed is a method of manufacturing a protector having these characteristics which also improves the protector quality and durability of molding devices being used.

It is, therefore, an object of the present invention to provide a flexible one piece license plate protector which remains substantially transparent in use, even upon being marred, scratched or weathered.

It is a further object of the present invention to produce a license plate protector with improved flexibility and resistance to shattering, cracking and similar structural damage.

Yet another object is to provide a license plate protector which combines the simplicity of design of a one piece resin based protector with improved positioning and enclosure capability, along with improved adaptability to varying methods of attachment to the license plate and motor vehicle.

It is yet another object of the present invention to provide the above described transparency and other denoted characteristics in a license plate protector which is also printable, so as to permit carrying advertising and other desired alpha-numeric information.

It is another object of the present invention to provide an improved method for manufacturing a license plate protector with the above described characteristics (including improved quality of protector surfaces) while offering improved durability and life of molding devices used in the manufacturing process.

SUMMARY OF THE INVENTION

The present invention presents a solution to the problems described above, by providing an improved license plate protector, whereby the transparency of the plate protector is substantially maintained during use, flexibility and resistance to structural damage is heightened, and various other improvements in positioning and securing the protector to the license plate and the motor vehicle are achieved.

The objects, benefits and advantages of the present invention accordingly are achieved by the present invention, whereby improved transparency characteristics, flexibility and damage resistance, and positioning and securing technique for a license plate protector are all achieved.

In accordance with one preferred embodiment of the present invention, a license plate protector is provided, comprising a flexible one piece cover made of polycarbonate resin offering high structural flexibility and resistance to cracking or loss of transparency, even upon being marred, scratched or weathered in use. The cover further comprises a substantially solid face and back plane, upon which are defined attachment locations that correspond to aligned holes in a license plate for attachment to a motor vehicle. At least two of these locations further define upper attachment holes through the cover from the face to the back plane, and other attachment locations may be defined to properly identify positions for drilling of lower attachment holes where State law or owner preference dictates such lower attachment holes. The plate protector further comprises a rib extending in a generally rearward direction from at least three sides of the cover, namely a top surface and two sides of the back plane. Retaining tabs are formed in an inboard direction, and attached to the rib on each of the left and right side to permit a secure, substantially rattle free connection of the cover to the license plate. Each attachment location, whether or not also defining an attachment hole, will further have at least one positioning tab formed about that location. Such tabs extend rearward from the back plane to space the cover from raised alpha-numeric embossing on the license plate, to aid in obtaining a secure, rattle free connection, and to assist in positioning optional attachment holes.

In accordance with a preferred method embodiment of the present invention, a method of making a flexible one piece transparent license plate protector is provided comprising the steps of drying polycarbonate resin with a heater, and forming a license plate protector by application of heat and pressure to such resin in a molding device having mold surfaces comprising stainless steel or chrome plating.

BRIEF DESCRIPTION OF THE DRAWINGS

Other objects, features and advantages of the present invention will become apparent after reference to the following detailed description and drawings, wherein.

DESCRIPTION OF THE PREFERRED EMBODIMENTS

Figure 1:
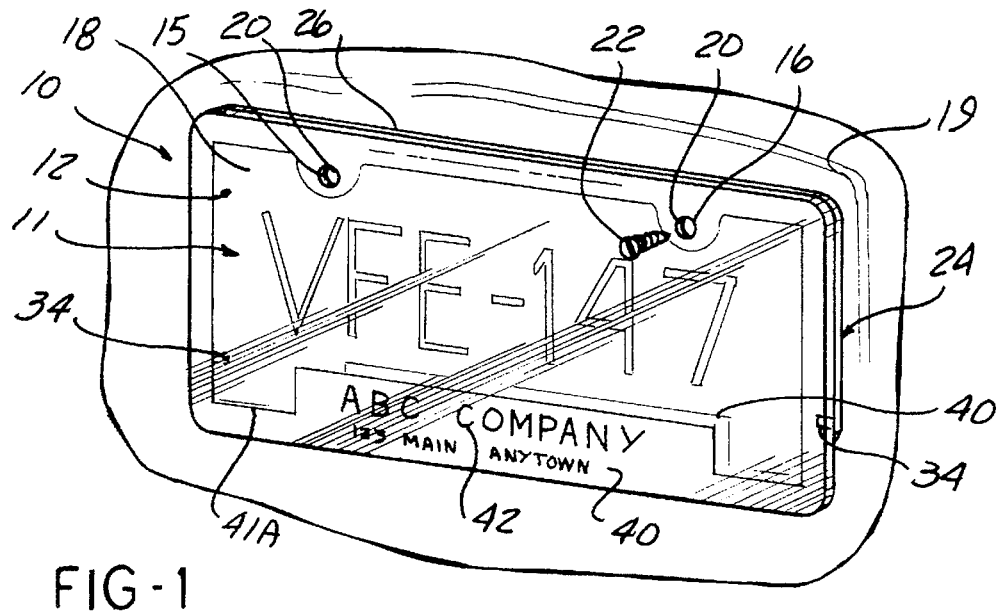
FIG. 1 is a front perspective view of a license plate protector made in accordance with one embodiment of the present invention, showing the face of the plate protector with a printed border.
Figure 2:
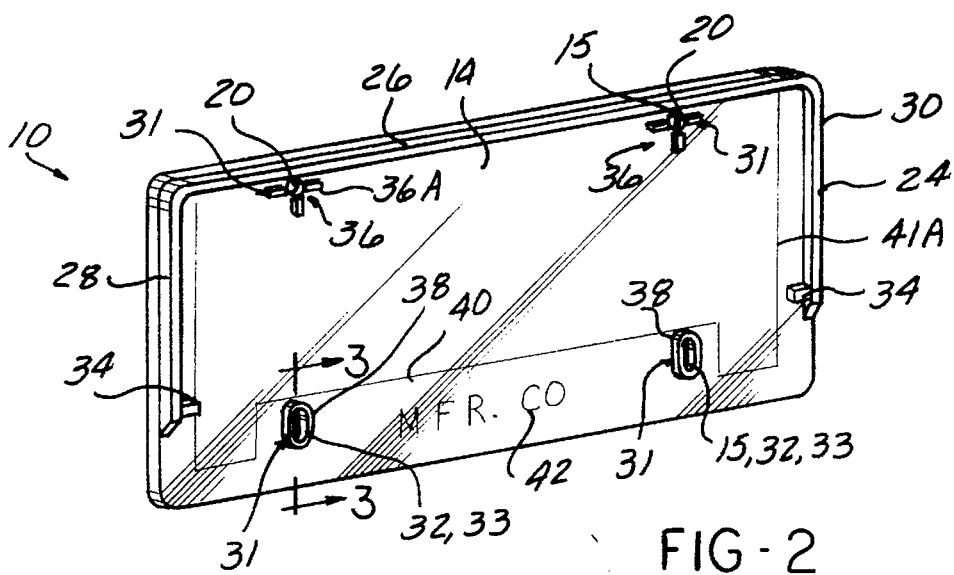
FIG. 2 is a back perspective view of the embodiment in FIG. 1, showing certain aspects of the back plane of the plate protector.

Referring now in detail to the drawings, a license plate protector 10 made in accordance with the present invention is illustrated in FIGS. 1 & 2. As shown, a relatively light weight license plate protector 10 is provided, comprising a flexible one piece cover 11 preferably made of ultraviolet ("UV") stabilized polycarbonate resin 11A. The cover 11 has a substantially solid face 12 and back plane 14, wherein the cover 11 remains substantially transparent upon marring or scratching of the face 12. The cover 11 further defines a plurality of attachment locations 15 which correspond to a plurality of aligned holes 16 formed in a license plate 18 for the purpose of attachment to a motor vehicle 19. At least two of the attachment locations 15 define upper attachment holes 20 extending from the face 12 through the back plane 14. This permits containment of the license plate 18 between the cover 11 and a motor vehicle 19 by passing fasteners 22 through the upper attachment holes 20 and the aligned holes 16 defined in the license plate 18.

The cover further comprises a perimeter rib 24 extending in a generally rearward direction from the face 12 (and thus toward the motor vehicle) from at least three sides of the back plane, namely a top surface 26, a left side 28 and a right side 30. This perimeter rib 24 helps position the plate protector 10 about the license plate 18, and provides protection to the license plate 18 from adverse weather elements, and in combination with other aspects of the plate protector 10 enables a substantially rattle and vibration free connection to be made between the plate protector 10, the license plate 18 and the motor vehicle 19.

Referring again to FIGS. 1 & 2, the cover 11 additionally comprises at least one positioning tab 31 in proximity to each attachment location 15, extending in a generally rearward direction from the back plane 14. This is for spacing raised alpha-numeric characters 31A (such as letters and numbers) on the license plate 18 from the cover 11, and for obtaining a secure, substantially rattle and vibration free connection of the cover 11 and the license plate 18 to the motor vehicle 20. The positioning tabs 31 further assist in locating appropriate positions for a plurality of lower attachment locations 32 at which lower attachment holes 33 may optionally be drilled through the cover 11 on a selective basis.

A further aspect of the cover 11 comprises a plurality of retaining tabs 34 extending inboard from the perimeter rib 24 to help provide a secure, substantially rattle and vibration free locking connection of the cover 11 to the license plate 18 and the motor vehicle 19. The plate 18 may be locked to the protector 10 in preparation for installation on the motor vehicle 19 by presence of the retaining tabs 34 which allows for easy installation as a single unit.

The positioning tabs 31 may generally take any configuration that will achieve the spacing, connecting and positioning functions described above, in a one piece polycarbonate cover 11. In one preferred embodiment shown in FIG. 2, the positioning tabs 31 comprise a plurality of sets of extender tabs 36, with each set 36 circumferentially spaced around an attachment location 15. Each set of extender tabs 36 comprises a plurality of individual extender tabs 36A, which in the embodiment shown in FIG. 2 includes three such extender tabs 36A in the set 36. Each set of extender tabs 36 is, without necessity of equal spacing between individual tabs 36A, circumferentially spaced around one attachment location 15. Each attachment location 15 has positioning tabs 31 in some embodiment located in proximity to that attachment location 15, although there is no requirement that any one embodiment of positioning tabs 31 (such as the extender tabs 36) be used in every attachment location 15 for a given plate protector 10.

In one preferred embodiment, shown in FIG. 2, the attachment locations 15 comprise two upper attachment holes 20 and two lower attachment locations 32 which are capable of having lower attachment holes 33 drilled from the face 12 through the back plane 14.

Referring again to FIG. 2, an alternative preferred embodiment of the positioning tabs 31 comprises a plurality of enclosed tabs 38. In this embodiment, each enclosed tab 38 encircles an attachment location 15. The enclosed tabs 38 may be used to encircle a plurality of upper attachment holes 20 as well as a plurality of lower attachment locations 32, or enclosed tabs 38 may be used in combination with other embodiments to mix the type of positioning tabs 28 used with a given plate protector 10.

Figure 3:
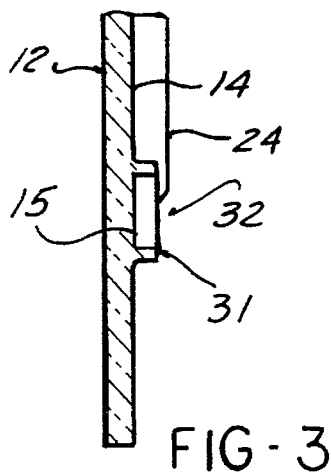
FIG. 3 is a side cross sectional view of the details of a lower attachment location, taken along line 3—3 of FIG. 2.

In one alternative embodiment, also shown in FIG. 2, attachment locations 15 comprise two upper attachment holes 20 and two lower attachment locations 32 which define the appropriate positions for and are capable of having lower attachment holes 33 drilled through from the face 12 to the back plane 14. (The direction of drilling is not important.) As shown in FIG. 3, the lower attachment locations 32 may alternatively be left without having lower attachment holes 33 drilled, for use where applicable State law or owner preference dictates using only upper attachment holes 20. In this manner, the plate protector will in each embodiment present a substantially solid face 12, which will either have no lower attachment holes 33 drilled or will substantially seal the lower attachment holes 33 with fasteners 22.

Figure 4:
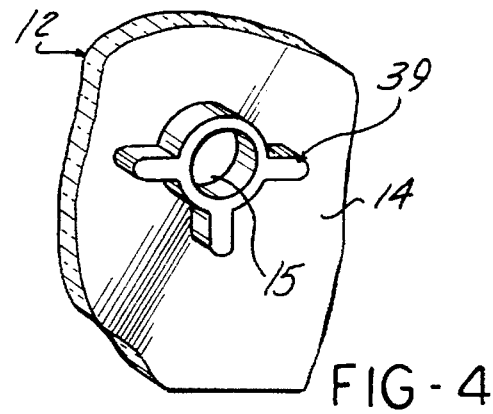
FIG. 4 is an enlarged, fractional portion of a back perspective view of a plate protector, showing an alternative embodiment of an enclosed rib at an attachment location.

An additional alternative embodiment for the positioning tabs 31 is shown in FIG. 4, in which the general configuration of a set of extender tabs 36 is combined with the general configuration of an enclosed tab 38 to form an enclosed extender tab 39.

As previously stated, the license plate protector 10 is preferably constructed of ultraviolet stabilized polycarbonate resin 11A, and may also be constructed of materials having similar properties. The preferred polycarbonate resin possesses additives providing ultraviolet stabilization ("UV stabilization"), and possesses the flexibility desired to virtually eliminate cracking due to impact or other forces potentially encountered in installation or use. It also enables the protector 10 to maintain substantially complete transparency even in light of marring, scratching and weathering by the elements over time. While a substantial number of UV stabilized polycarbonate resins 11A in general will work to substantially achieve the desired characteristics for the plate protector 10, it is preferred to use the UV stabilized resins 11A available from General Electric Company under the trademark Lexan®, and in particular the resin having grade and color identification LS2111, or any other General Electric automotive grade Lexan® resin having UV stabilization. These Lexan® resin grades may be used for any embodiments of the present invention. Although exact values are not important, some examples of characteristics of this LS2111 grade include the following approximate values: a yield tensile strength, Type I, 0.125", of 9000 psi (ASTMD638); a flexural modulus, 0.125" of 340000 psi (ASTMD790); an Izod impact strength, notched (73F) of 15.0 ft-lb/in (ASTMD638); and light transmittance (% at 0.125") of 88.0 (ASTMD1003). Other polycarbonate resins (such as a resin marketed under the trademark Merlon by Mobay Chemical) exhibiting relatively high impact strength, flexibility and substantially complete transparency even upon marring, scratching and weathering may alternatively be utilized.

Figure 5:
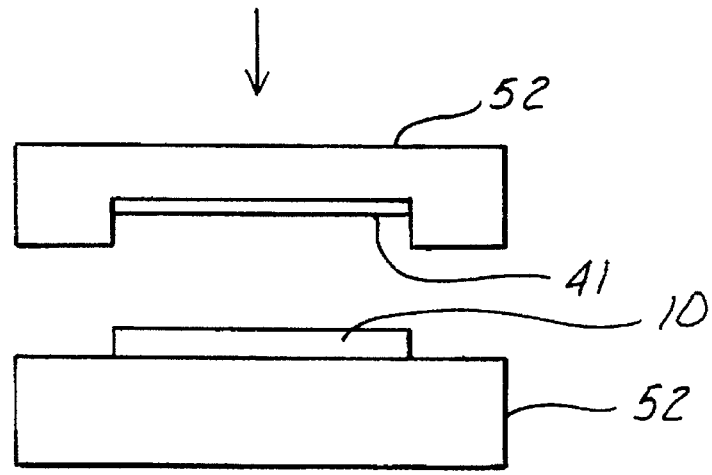
FIG. 5 is a front view of a hot stamping press used in one preferred method embodiment for making a license plate protector.

As shown in FIGS. 1 & 5, the cover 11 forming the license plate protector 10 is "printable" on both the face 12 and the back plane 14. "Printable" is used to mean an opaque border 40 may be added by conventional silk screen or pad printing techniques, or that an appearance coating 11 may be hot stamped onto the protector 10 to create the border 40 in an area defined by an inner boundary 41A etched onto the protector 10. Either or both of the face 12 and the back plane 14 may thus be "printable" with an opaque border 40, generally outlined in FIG. 1. Alpha-numeric information 42 may optionally be defined by printing onto the border (or by omission of the border 40 printing in areas defining such information 42) to convey desired information such as advertising messages. Similarly, alpha-numeric information 42 may be printed on the border 40 of the back plane 14, or such information 42 may be formed in the border 40 of the back plane 14 (or the face 12) as embossed or etched information. In embodiments using an embossed or etched back plane 14, silk screen and hot stamping techniques would only be used for creating a border 40 on the face 12. Pad printing may be used to create a border 40 on either the face 12 or the back plane 14 whether or not embossing or etching is present.

Figure 7:
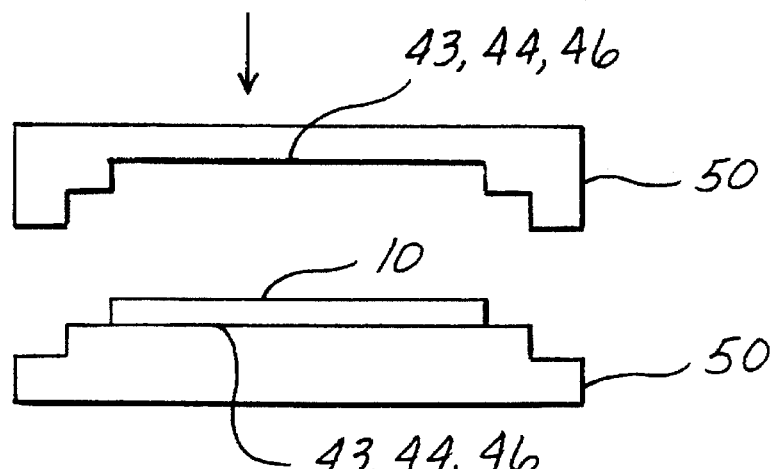
FIG. 7 is a front view of a molding device used in accordance with preferred embodiments of making a license plate protector.

The license plate protector embodiment disclosed in FIGS. 1 & 2 may be formed by injection molding of the polycarbonate resin 11A. FIG. 7 is illustrative. It is preferred that relatively smooth or polished mold surfaces 43 be utilized, in order that the transparency and finish on the face 12 be enhanced. It is further recommended that certain grades of steel be utilized (at least for the mold surfaces 43) to enhance the finish obtained, as well as to increase the number of protectors 10 that may be produced without having to re-polish or replace the mold surfaces 43, by using steel of sufficient hardness. P20 steel will work to produce acceptable plate protectors 10 but H13 steel is preferred due to a reduced need to polish the mold surfaces 43, and because P20 steel occasionally may permit parts to incur undesired marks in the molding process. Stainless steel mold surfaces 44 are even more preferred, although a more expensive approach to utilize. A further preferred alternative would be to utilize chrome plated mold surfaces 46. Providing the material for mold surfaces 43 as stainless steel or chrome plating is for the purpose of improving the finish of the resulting plate protector 10 and the durability of the molding device 50 containing the mold surfaces 43, which should be enhanced by this approach as compared to use of conventional steel materials. Less rehabilitation, such as periodic polishing, should be necessary with these mold surfaces 43. Thus, it is preferable to select material for the mold surfaces 43 from the group consisting of stainless steel and chrome plating.

Figure 6:
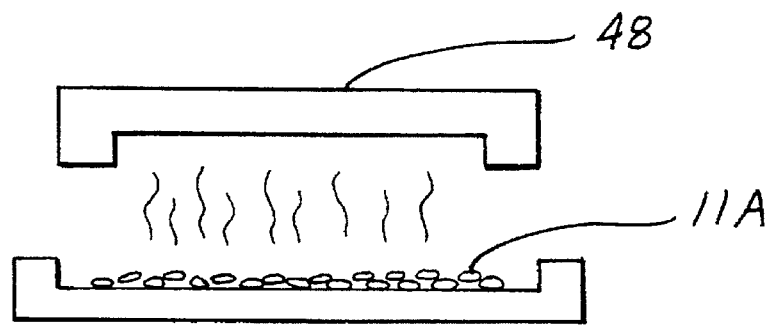
FIG. 6 is a front view of heater used in a drying step in making a license plate protector.

In order to obtain a molded protector 10 that has the desired transparency characteristics, it is preferred that the polycarbonate resin 11A such as Lexan® be dried before molding the protector 10, or that resin 11A is otherwise obtained with a relatively low moisture content. It is preferred that the moisture content be below approximately 3% by weight of the resin 11A in pelletized form. This is generally accomplished by preheating the pelletized resin 11A with hot air heaters, and gauging the resulting moisture content. FIG. 6 is illustrative. Other means of applying heat may also be utilized.

Referring now to one preferred method embodiment of the present invention, an improved one piece transparent license plate protector 10 as described above may be made by the following steps, which are illustrated in FIGS. 1, 5, 6 & 7. Polycarbonate resin 11A in pelletized form is subjected to drying by use of a heater 48 to reduce moisture content below about 3% by weight. Forming of the protector 10 is then completed by molding through application of heat and pressure to the resin 11A with a molding device 50. The molding device 50 preferably either has stainless steel mold surfaces 44 or chrome plated mold surfaces 46, shown in FIG. 7, although other mold surfaces 43 will work to produce acceptable protectors 10. As previously noted, these mold surfaces 44, 46 are used to improve the resulting surface finish of the protector 10 and lengthen the effective life of the molding device 50 before the mold surfaces 44, 46 need be polished or replaced due to wear. Upper and lower attachment holes 20, 33 may be defined as part of the forming step, or drilling of holes 20, 33 may separately be performed. Printing of the protector 10 then may occur if desired, by any of the techniques previously described. As shown in FIG. 1 and 5, this printing optionally may comprise the step of hot stamping an appearance coating 41 of desired composition onto the protector 10 by use of a press 52 in an area defined by an inner boundary 41A created by the previous step of etching of the protector 10 by conventional techniques.

Although only a few embodiments have been described in detail above, those having ordinary skill in the art will certainly understand that many modifications are possible in the preferred embodiments without departing from the teachings thereof. All such modifications are intended to be encompassed within the following claims.

I claim:

1. A license plate protector, comprising: a flexible one piece cover made of ultraviolet stabilized polycarbonate resin, for protection of a license plate, said cover having a substantially solid face and back plane wherein the cover remains substantially transparent upon marring, scratching or weathering of the face, and wherein the cover further defines a plurality of attachment locations at least two of which are adapted to correspond to two of a plurality of aligned holes in the license plate, with at least two of said attachment locations defining upper attachment holes extending from the face through the back plane, permitting containment of said license plate between said cover and a motor vehicle by passing fasteners through said attachment holes and aligned holes defined in the license plate, said cover also further comprising:

a perimeter rib extending in a generally rearward direction from at least a top surface, a left side and a right side of the cover back plane;

at least one positioning tab in proximity to each attachment location, extending in a generally rearward direction from the back plane, for spacing raised alphanumeric characters on the license plate from the cover, obtaining a secure, substantially rattle free connection of the cover and license plate to the motor vehicle, and locating appropriate positions for a plurality of lower attachment holes to optionally be drilled through the cover at selected lower attachment locations; and a plurality of retaining tabs extending inboard from the perimeter rib to provide a secure, substantially rattle free connection of the cover to the license plate;

wherein the cover is printable on at least one of the face and back plane; and wherein the positioning tabs comprise a plurality of sets of extender tabs, with each set circumferentially spaced around an attachment location.

2. A license plate protector as recited in claim 1, wherein the attachment locations comprise two upper attachment holes and two lower attachment locations capable of having optional lower attachment holes drilled from the face through the back plane.

3. A license plate protector as recited in claim 1, wherein the positioning tabs further comprise a plurality of enclosed tabs, wherein an enclosed tab encircles each attachment location.

4. A license plate protector as recited in claim 3, wherein the attachment locations comprise two upper attachment holes and two lower attachment locations capable of having optional attachment holes drilled from the face to the back plane.

5. A license plate protector as recited in claim 2, wherein the positioning tabs comprise two sets of extender tabs, with each set circumferentially spaced around an attachment location, and two enclosed tabs wherein each enclosed tab encircles an attachment location.

6. A license plate protector as recited in claim 5, wherein a set of extender tabs is spaced around each of the two upper attachment holes and an enclosed tab encircles each of the two lower attachment locations.

7. A license plate protector, comprising: a flexible one piece cover made of ultraviolet stabilized polycarbonate resin, for protection of a license plate, said cover having a substantially solid face and back plane wherein the cover remains substantially transparent upon marring, scratching or weathering of the face, and wherein the cover further defines a plurality of attachment locations at least two of which are adapted to correspond to two of a plurality of aligned holes in the license plate, with at least two of said attachment locations defining upper attachment holes extending from the face through the back plane, permitting containment of said license plate between said cover and a motor vehicle by passing fasteners through said attachment holes and aligned holes defined in the license plate, said cover also further comprising:

a perimeter rib extending in a generally rearward direction from at least a top surface, a left side and a right side of the cover back plane;

at least one positioning tab in proximity to each attachment location, extending in a generally rearward direction from the back plane, for spacing raised alphanumeric characters on the license plate from the cover, obtaining a secure, substantially rattle free connection of the cover and license plate to the motor vehicle, and locating appropriate positions for a plurality of lower attachment holes to optionally be drilled through the cover at selected lower attachment locations; and a plurality of retaining tabs extending inboard from the perimeter rib to provide a secure, substantially rattle free connection of the cover to the license plate;

wherein the polycarbonate resin comprises a ultraviolet stabilized resin having a yield tensile strength of approximately 9000 psi, and light transmittance of approximately 88.0%;

wherein the cover is printable on at least one of the face and back plane; and wherein the positioning tabs comprise a plurality of sets of extender tabs, with each set circumferentially spaced around an attachment location.

8. A license plate protector as recited in claim 7, wherein the attachment locations comprise two upper attachment holes and two lower attachment locations capable of having optional lower attachment holes drilled from the face to the back plane.

9. A license plate protector as recited in claim 7, wherein the positioning tabs further comprise a plurality of enclosed tabs, wherein an enclosed tab encircles each attachment location.

10. A license plate protector as recited in claim 9, wherein the attachment locations comprise two upper attachment holes and two lower attachment locations capable of having optional lower attachment holes drilled from the face to the back plane.

11. A license plate protector as recited in claim 8, wherein the positioning tabs comprise two sets of extender tabs, with each set circumferentially spaced around an attachment location, and two enclosed tabs wherein each enclosed tab encircles an attachment location.

12. A license plate protector as recited in claim 11, wherein a set of extender tabs is spaced around each of the two upper attachment holes and an enclosed tab encircles each of the two lower attachment locations.

13. A license plate protector as recited in claim 12, wherein the face of the cover is printed with an opaque border.

14. A license plate protector as recited in claim 13, wherein alpha-numeric information is formed in an area of the back plane border.

15. A license plate protector as recited in claim 14, wherein the printed opaque border on the face defines alpha-numeric information, and wherein the ultraviolet stabilized polycarbonate resin has a flexural modulus of approximately 340,000 psi, and an izod impact strength, notched of approximately 15.0 ft-lb/inch.

16. A license plate protector as recited in claim 11, wherein at least two of the positioning tabs comprise enclosed extender tabs.

17. A license plate protector as recited in claim 15, wherein an enclosed extender tab is positioned about each of two upper attachment locations, and an enclosed tab encircles each of two lower attachment locations.

* * * * *